(12) United States Patent
Nakanishi

(10) Patent No.: US 9,514,056 B2
(45) Date of Patent: Dec. 6, 2016

(54) VIRTUAL MEMORY SYSTEM, VIRTUAL MEMORY CONTROLLING METHOD, AND PROGRAM

(75) Inventor: Kenichi Nakanishi, Tokyo (JP)

(73) Assignee: Sony Corporation, Tokyo (JP)

( * ) Notice: Subject to any disclaimer, the term of this patent is extended or adjusted under 35 U.S.C. 154(b) by 520 days.

(21) Appl. No.: 13/372,615

(22) Filed: Feb. 14, 2012

(65) Prior Publication Data

US 2012/0226850 A1 Sep. 6, 2012

(30) Foreign Application Priority Data

Mar. 4, 2011 (JP) .................................. 2011-047376

(51) Int. Cl.
*G06F 12/10* (2016.01)

(52) U.S. Cl.
CPC ..... *G06F 12/1009* (2013.01); *G06F 2212/202* (2013.01)

(58) Field of Classification Search
CPC ...................... G06F 12/1009; G06F 2212/652
See application file for complete search history.

(56) References Cited

U.S. PATENT DOCUMENTS

| 5,278,970 A * | 1/1994 | Pence .................... G11B 20/10 710/68 |
| 8,539,194 B2 * | 9/2013 | Inoue et al. ................... 711/171 |
| 2011/0283075 A1 * | 11/2011 | Jess et al. ..................... 711/162 |
| 2012/0005412 A1 * | 1/2012 | Ware .............................. 711/103 |

FOREIGN PATENT DOCUMENTS

JP 2007-188499 7/2007

* cited by examiner

*Primary Examiner* — Eric S Cardwell
(74) *Attorney, Agent, or Firm* — Chip Law Group

(57) ABSTRACT

Disclosed herein is a virtual memory system including a nonvolatile memory allowing random access, having an upper limit to a number of times of rewriting, and including a physical address space accessed via a virtual address; and a virtual memory control section configured to manage the physical address space of the nonvolatile memory in page units, map the physical address space and a virtual address space, and convert an accessed virtual address into a physical address; wherein the virtual memory control section is configured to expand a physical memory capacity allocated to a virtual page in which rewriting occurs.

17 Claims, 17 Drawing Sheets

USE STATE FLAG uflag : UNUSED = 0 / USED = 1
WRITING VOLUME CWAM UP TO PRESENT TIME

PPGMT10
PHYSICAL PAGE MANAGEMENT
INFORMATION TABLE

Page Directory Table Entry : PDTE11

Non-Volatile Memory

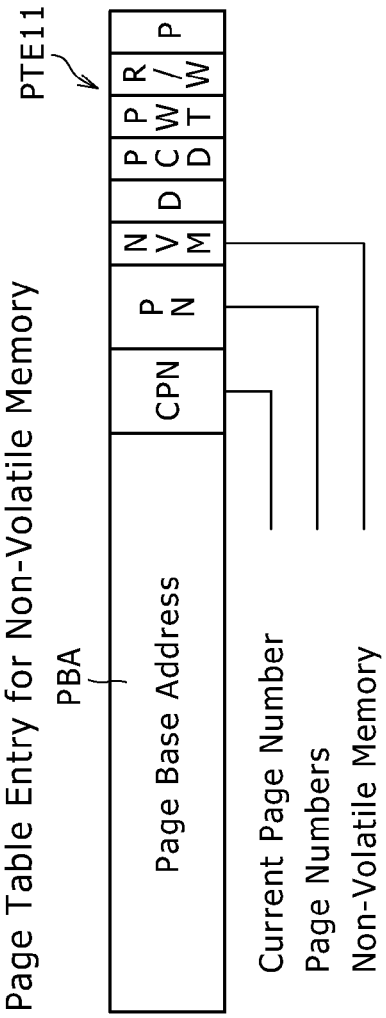
F I G. 10A
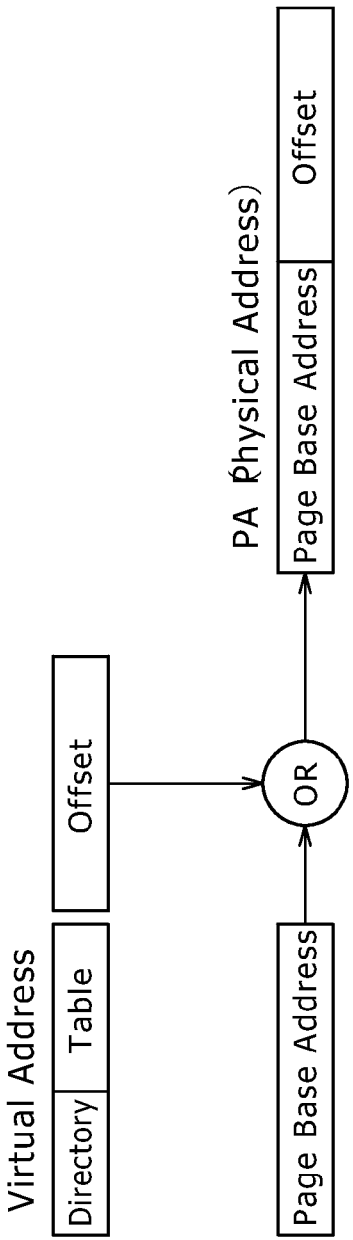
F I G. 10B

VIRTUAL MEMORY SYSTEM, VIRTUAL MEMORY CONTROLLING METHOD, AND PROGRAM

BACKGROUND

The present disclosure relates to a virtual memory system, a virtual memory controlling method, and a program compatible with a nonvolatile random access memory that is nonvolatile, which has an upper limit to the number of times of rewriting, and which allows random access.

A current virtual memory system is formed by a memory management unit referred to as an MMU (Memory Management Unit) and virtual memory control software implemented as a function of an operating system.

The virtual memory system having such a configuration is used in various systems as a system intended for the physical memory space of a DRAM as a volatile memory.

The virtual memory system divides and manages the physical memory (physical address) space in page units. An application that needs memory requests and secures a necessary virtual page from the virtual memory system in advance before using the virtual page. This is referred to as demand paging.

In the virtual memory system, only a necessary memory capacity is secured. Thus, a limited physical memory capacity can be used efficiently. In addition, access to the physical memory space is made using a virtual address space independent for each application.

The virtual memory system therefore provides an advantage of allowing an arrangement of discontinuous physical pages in the physical address space to be accessed as a continuous virtual page space in the virtual address space.

In addition, when there is a shortage of capacity in the physical memory space for an application being executed, a process referred to as a swap-out process is performed which process writes the data of a physical page assigned to a virtual page determined to be used with a lowest frequency to a storage (swap area) such as a hard disk or the like. Thereafter the physical page is assigned as an unused physical page to a virtual address requested by the application. Thereby the shortage of the physical memory space can be supplied.

When access to the data of the page saved to the swap area in the storage occurs, a process (swap-in) of assigning a physical page to the virtual address of the data again and reading the data from the swap area is performed. Thereby the data can be accessed as data in virtual memory again.

These swap-out and swap-in processes at the time of occurrence thereof involve the occurrence of access to the storage and data transfer between the memory and the storage, and thus cause a temporary degradation in system performance as viewed from an application. However, the swap-out and swap-in processes have an advantage of enabling an application to be executed without being limited by the physical memory capacity.

Japanese Patent Laid-Open No. 2007-188499 proposes a technique for improving system performance.

This technique uses a nonvolatile memory typified by a NAND flash memory in a present situation as a high-speed storage, thereby increasing the speed of the loading of code and data and processes of demand paging such as the swap-out and the swap-in described above, and thus improving system performance.

However, unlike the NAND flash memory, nonvolatile memory devices such as a PCM, a ReRAM, and the like under development as next-generation memories have a feature of allowing high-speed random access in word units as in an SRAM and a DRAM.

When the feature of nonvolatility of such a nonvolatile random access memory is utilized, the nonvolatile random access memory not only can form a higher-speed storage than a NAND flash memory but also makes it possible to realize a high-speed system with low power consumption by replacing a DRAM as a work memory.

SUMMARY

Next-generation nonvolatile random access memories have a function of performing a verifying process and detecting a writing error at a time of writing to a memory cell. In order to reduce a rate of occurrence of the error to a certain level or lower, the nonvolatile random access memory needs to be used so as not to exceed an upper limit to the number of times of rewriting. On the other hand, a volatile memory such as an SRAM, a DRAM, or the like does not cause writing errors, and does not have an upper limit to the number of times of rewriting. In order to realize the replacement of a volatile memory such as an SRAM, a DRAM, or the like by such a next-generation nonvolatile random access memory, a system needs to be constructed with the upper limit to the number of times of rewriting taken into account.

The nonvolatile memory is degraded in data retention characteristic as the number of times of rewriting is increased, and thus has a limit to the number of times of rewriting of cells.

When a nonvolatile random access memory is used as a work memory as it is in a current system assuming a memory without an upper limit to the number of times of rewriting such as a volatile memory or the like, the following disadvantage may result. When a nonvolatile random access memory is used as a work memory as it is, concentration of rewriting in a particular area may cause data errors, and thus produce a fatal effect on the operation of the system.

In a current system, the resources of a volatile random access memory are managed by a virtual memory system.

By making the virtual memory system compatible also with the nonvolatile random access memory, it is possible to exert an effect of reducing power consumption due to the nonvolatility of the nonvolatile random access memory while realizing useful functions such as demand paging and the like in the current system.

Specifically, in the case of the nonvolatile random access memory, the supply of power to the memory device of an address area not being accessed can be stopped. Thus, the nonvolatile random access memory consumes less power than a volatile memory having a same capacity, and further makes instant starting and instant ending of the system possible because there is no need to access a storage to store and reproduce the state of the memory at the times of starting and ending the system.

However, the virtual memory system in the present situation has a mechanism for realizing access from an application to memory via a virtual memory address.

As a result, the virtual memory system in the present situation determines the assignment of physical pages according to order depending on requests from applications, and has no means for management and control to prevent the concentration of data writing to a particular physical page.

In addition, monitoring writing access to physical pages and measuring the number of times of rewriting of each physical page is very difficult to realize without affecting access performance, and may cause an area for storing the number of times of rewriting to squeeze a data area.

It is desirable to provide a virtual memory system, a virtual memory controlling method, and a program that enable the avoidance of limitation on writing from applications in accessing a nonvolatile memory having a limit to the number of times of rewriting.

According to a first embodiment of the present disclosure, there is provided a virtual memory system including: a nonvolatile memory allowing random access, having an upper limit to a number of times of rewriting, and including a physical address space accessed via a virtual address; and a virtual memory control section configured to manage the physical address space of the nonvolatile memory in page units, map the physical address space and a virtual address space, and convert an accessed virtual address into a physical address; wherein the virtual memory control section is configured to expand a physical memory capacity allocated to a virtual page in which rewriting occurs.

According to a second embodiment of the present disclosure, there is provided a virtual memory controlling method including: managing a physical address space of a nonvolatile memory in page units, the nonvolatile memory allowing random access, having an upper limit to a number of times of rewriting, and including a physical address space accessed via a virtual address, mapping the physical address space and a virtual address space, and converting an accessed virtual address into a physical address, when rewriting occurs in a virtual page, expanding a physical memory capacity allocated to the virtual page according to information on an amount of writing to the virtual page.

According to a third embodiment of the present disclosure, there is provided a program for making a computer perform a virtual memory controlling process, the virtual memory controlling process including: managing a physical address space of a nonvolatile memory in page units, the nonvolatile memory allowing random access, having an upper limit to a number of times of rewriting, and including a physical address space accessed via a virtual address, mapping the physical address space and a virtual address space, and converting an accessed virtual address into a physical address, when rewriting occurs in a virtual page, expanding a physical memory capacity allocated to the virtual page according to information on an amount of writing to the virtual page.

According to the present disclosure, it is possible to avoid writing limitation without affecting the performance of access from an application in accessing a nonvolatile memory having a limit to the number of times of rewriting.

BRIEF DESCRIPTION OF THE DRAWINGS

FIGS. 10A and 10B are diagrams showing an example of an entry in a page table according to the present embodiment and a process of generating a physical address from the entry and a virtual address;

DETAILED DESCRIPTION OF THE PREFERRED EMBODIMENTS

Preferred embodiments of the present disclosure will hereinafter be described with reference to the drawings.

Incidentally, description will be made in the following order.

1. First Embodiment (First Example of Configuration of Virtual Memory System)
2. Second Embodiment (Second Example of Configuration of Virtual Memory System)
3. Third Embodiment (Third Example of Configuration of Virtual Memory System)

1. First Embodiment

Figure 1:
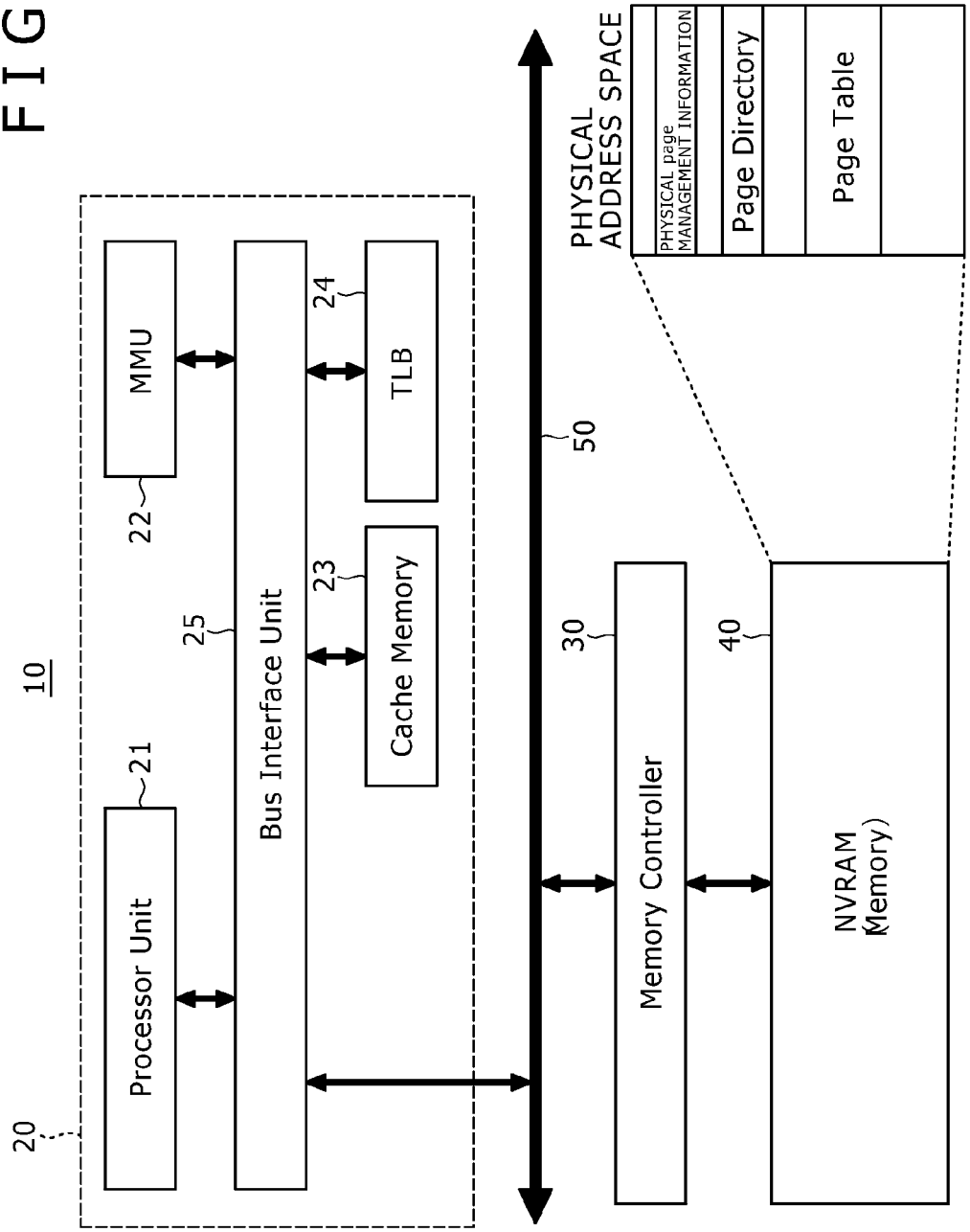
FIG. 1 is a diagram showing a configuration of a virtual memory system to which a nonvolatile random access memory (NVRAM) according to a first embodiment of the present disclosure is applied.

FIG. 1 is a diagram showing a configuration of a virtual memory system to which a nonvolatile random access memory (NVRAM) according to a first embodiment of the present disclosure is applied.

The present virtual memory system 10 includes a CPU 20 as a virtual memory control section, a memory controller 30, a nonvolatile random access memory (NVRAM) 40, and a system bus 50.

The nonvolatile random access memory 40 is randomly accessible, and has an upper limit to the number of times of rewriting. The physical address space of the nonvolatile random access memory 40 is accessed via a virtual address space under control of the CPU 20.

The CPU 20 includes a processor unit 21, a memory management unit (MMU) 22, and a cache memory 23.

The CPU 20 also includes a translation look-aside buffer (TLB) 24 and a bus interface unit 25.

The virtual memory system 10 according to the present embodiment is formed as a virtual memory system assuming the nonvolatile random access memory 40 that basically has an upper limit to the number of times of rewriting.

The present virtual memory system 10 has a first function of determining the allocation and size of a memory area in consideration of the number of times of rewriting of the memory area to be allocated from an application.

In addition, the virtual memory system 10 has a second function of receiving an internal event of a timer or the like or an instruction from an OS or an application and moving data to average a number of times of writing between assigned physical pages.

In addition, in the virtual memory system 10, the CPU 20 as the virtual memory control section obtains information on the upper limit to the number of times of rewriting of the nonvolatile random access memory 40 from the memory controller. The virtual memory system 10 is thereby formed so as to be able to perform the first function and the second function described above flexibly according to the specification of the number of times of rewriting of each nonvolatile random access memory.

In the virtual memory system 10 of FIG. 1, the CPU 20 as the virtual memory control section accesses the nonvolatile random access memory 40 via the memory controller 30 connected to the system bus 50.

The processor unit 21 within the CPU 20 is connected to the system bus 50 via the bus interface unit 25.

The bus interface unit 25 is connected with the MMU 22, the cache memory 23, and the TLB 24 for caching entries of a page directory table and a page table used by the MMU 22.

Incidentally, a CPU independently having a cache memory 23 and a TLB 24 for instructions and a cache memory 23 and a TLB 24 for data, or a CPU having a cache memory in a plurality of stages such as L1, L2, and L3, for example, can also be applied as the CPU.

The memory controller 30 identifies a memory device to be accessed in the memory connected to the memory controller 30 according to an input command and an input address, and makes access for read (readout) and write (writing) according to the command.

In the first embodiment of the present disclosure, the memory is a nonvolatile random access memory. However, as will be described later, it is also possible to connect a volatile memory such as a DRAM or the like, and configure the virtual memory system 10 as an ordinary virtual memory system.

This CPU 20 functions as the virtual memory control section. The CPU 20 according to the present embodiment is configured to have the following functions.

In the CPU 20, virtual memory control is basically performed with the MMU 22 and virtual memory control software as a center.

The MMU 22 has functions of managing the physical address space of the nonvolatile random access memory 40 in page units, retaining information mapping the physical address space and the virtual address space as a table, and converting an accessed virtual address to a physical address using the table.

The virtual memory control section has a function of assigning a new physical page to a virtual page and a function of releasing a physical page assigned to a virtual page by the MMU 22 and the virtual memory control software.

The MMU 22 manages correspondences between virtual pages and physical pages by a management table, as will be described later.

When there occurs a shortage of unused physical pages, the virtual memory control section performs control to select a virtual page determined to have a little effect on performance from among virtual pages that are managed by the MMU 22 and to which physical pages are already assigned, and write the data of a physical page assigned to the virtual page to a dedicated area in a storage.

In this case, to select a virtual page determined to have a little effect on performance is to select a page determined to be accessed with a lowest access frequency, for example.

After saving the data of the above physical page to the storage, the virtual memory control section sets a flag indicating that the virtual page is not present in the physical memory for an attribute in the management table of the virtual page assigned to the above physical page.

When the data of the physical page written to the dedicated area in the storage becomes necessary again, the virtual memory control section performs control to read the data into a free physical page, and at this time, resets the flag of the attribute in the management table managed by the MMU 22 which flag indicates that the virtual page is not present in the memory.

Incidentally, examples of the storage include a hard disk and the like.

The virtual memory control section has functions of receiving a request to assign a physical page to a virtual page and information on an amount of data writing to the requested area, and expanding a physical memory capacity assigned to the virtual page on the basis of the received information on the amount of writing.

The MMU 22 can map physical addresses and virtual addresses in page units, and assign and manage a plurality of physical pages to a virtual page where rewriting occurs on the basis of information on an amount of writing to the virtual page.

The virtual memory control section determines a capacity to which to expand the physical memory capacity according to a result of calculation of a number of times of rewriting occurring in the physical page from the information on the amount of data writing.

The virtual memory control section has a function of moving data between assigned physical pages to average a number of times of writing according to an internal event of a timer or the like or an instruction from an OS or an application.

In the present embodiment, the virtual memory system 10 has two management tables including information for converting a virtual address to a physical address.

Figure 5:
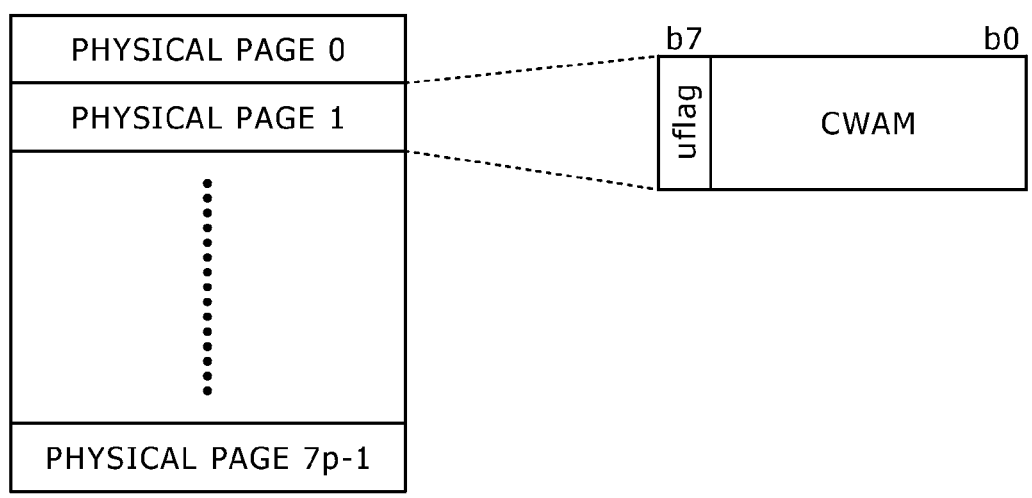
FIG. 5 is a diagram showing an example of a physical page management information table according to the present embodiment.

The first management table includes information indicating whether a physical page is assigned to a virtual page and is being used or whether the physical page is unassigned and unused as well as information on a cumulative volume of past writing of the physical page as physical page management information (FIG. 5 to be described later).

The second management table includes information for managing a physical page address assigned to a virtual page as address conversion information. This information includes information indicating whether the physical page is present in the nonvolatile memory and information on the determined capacity to which the physical page is expanded.

In the virtual memory system 10, the virtual memory control section has a function of performing control to access a part of the capacity to which the physical page is expanded according to an internal event of the timer or the like or an instruction from the OS or the application as a process for reducing the occurrence of a data error due to an increase in the number of times of writing to the physical page assigned to a virtual page.

In the present embodiment, the information of the management tables is stored in the nonvolatile random access memory 40.

Thus, at a time of turning on power, the table information is read from the nonvolatile random access memory 40 so that a state before the power is turned off can be restored.

In addition, the virtual memory control section of the CPU 20 can also obtain the information on the upper limit to the number of times of rewriting of the nonvolatile random access memory 40 from the memory controller 30.

Virtual memory control in the CPU 20 having the characteristic configuration as described above will be concretely described in the following while the virtual memory system 10 is compared with an ordinary virtual memory system to which a volatile memory rather than a nonvolatile random access memory is applied.

[Ordinary System]

A system using a DRAM controller as a memory controller and using a DRAM, which is a volatile memory, as a work memory is most common among ordinary systems in the present situation.

There have recently been devices including a DRAM controller in a CPU in order to improve efficiency of transfer between the CPU and a work memory.

In such a system in the present situation, all of the memory is volatile, and thus a ROM referred to as a BIOS is necessary to start the system.

Then, a program referred to as a boot loader within the BIOS is executed, whereby a program code and data necessary for execution of the OS, or the OS as well as an application depending on the OS, are loaded from a storage such as a hard disk or the like into the work memory, and sequentially subjected to the execution.

The access time of the hard disk is a few ten ms, whereas the access time of the DRAM as the work memory is on the order of a few ten ns. There is thus a wide gap between the access times.

The advent of an SSD including a NAND flash memory improved the access time of the storage to a few hundred μs. However, there is still a gap in access speed from the DRAM, which gap is a great factor in hindering efficient operation of the CPU.

[Ordinary Mapping of Virtual Address Space and Physical Address Space]

Figure 2:
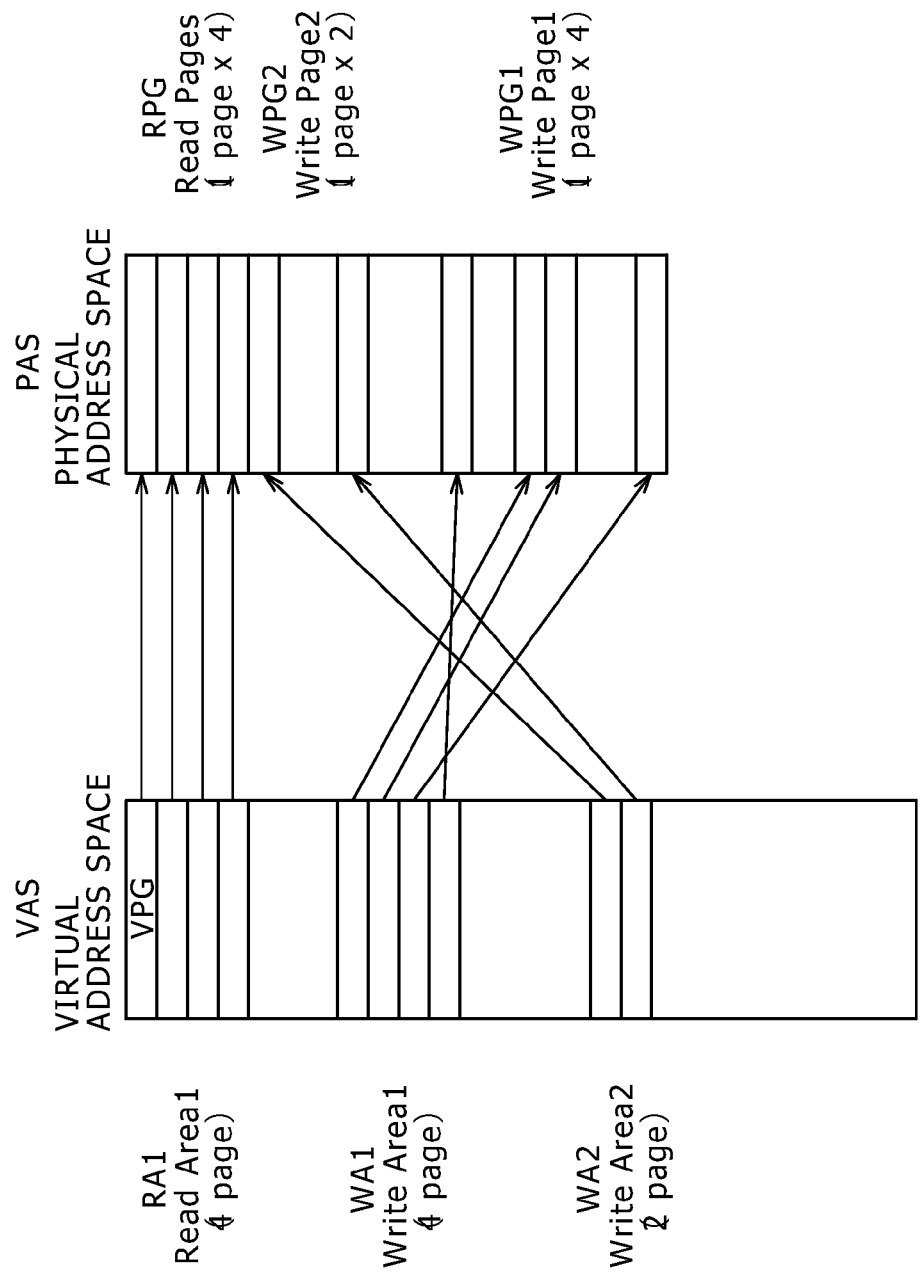
FIG. 2 is a diagram showing an example of ordinary mapping of a virtual address space and a physical address space.

FIG. 2 is a diagram showing an example of ordinary mapping of a virtual address space and a physical address space.

A memory used in an ordinary virtual memory system is a volatile memory without an upper limit to the number of times of writing, such as an SRAM, a DRAM, or the like.

A virtual address space VAS is a larger address space than a physical address space PAS. Virtual addresses and physical addresses are mapped in unit areas generally having a size 4 Kbytes referred to as a page PG. One virtual page VPG is assigned to one physical page PPG. The virtual page VPG and the physical page PPG coincide with each other in size.

For example, a read area RA1 in FIG. 2 is an area for reading only, and write areas WA1 and WA2 are areas for reading and writing. In the three areas, the number of assigned virtual pages VPG coincides with the number of assigned physical pages PPG.

[Mapping of Virtual Address Space and Physical Address Space According to Present Embodiment]

Figure 3:
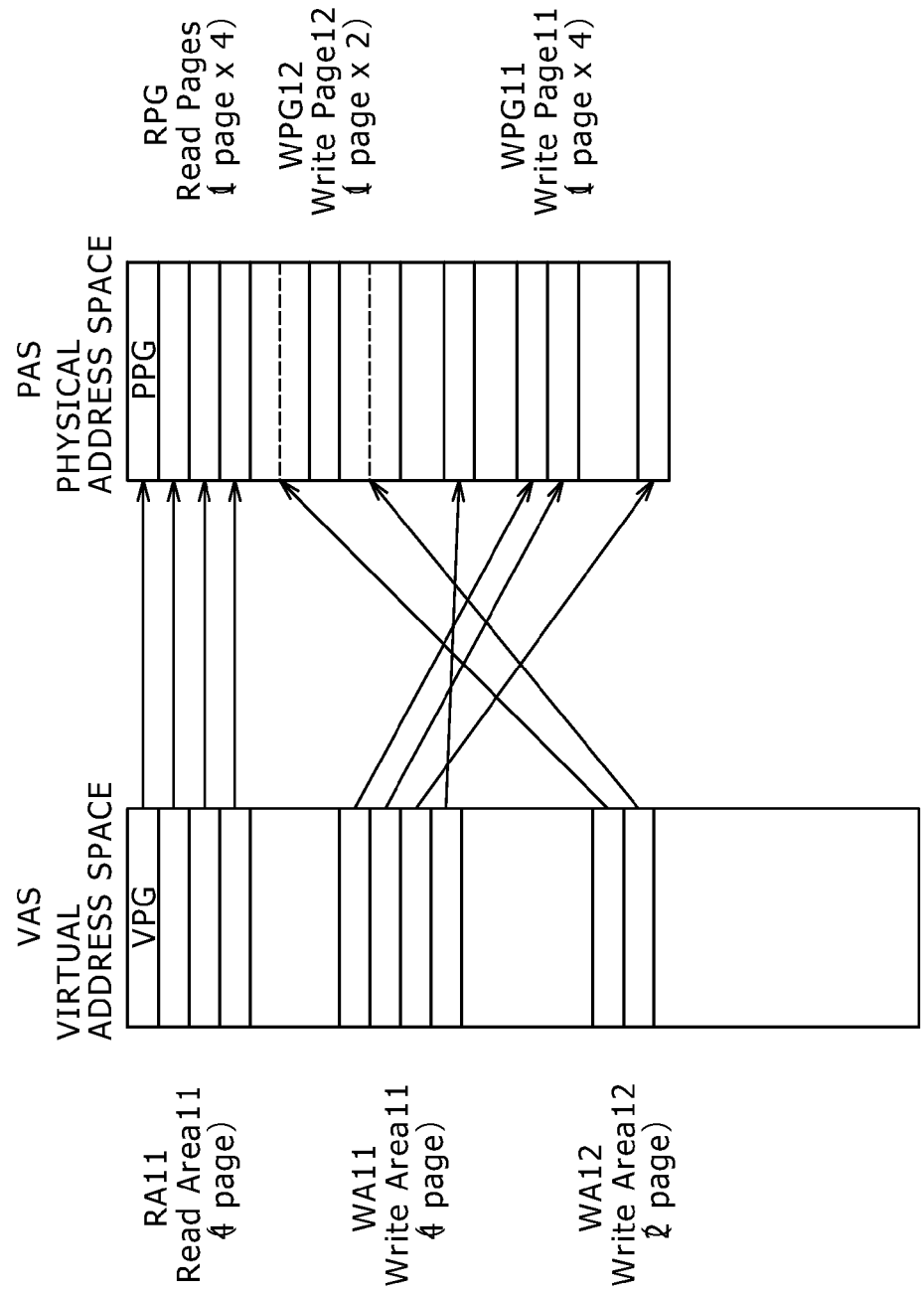
FIG. 3 is a diagram showing an example of mapping of a virtual address space and a physical address space according to the present embodiment.

FIG. 3 is a diagram showing an example of mapping of a virtual address space and a physical address space according to the present embodiment.

A memory used in this case is a nonvolatile random access memory, and is a memory having an upper limit to the number of times of rewriting.

The virtual memory system 10 according to the present embodiment is defined by avoiding the limitation on the number of times of rewriting by assigning a plurality of physical pages to a virtual page where rewriting occurs.

For example, a read area RA11 in FIG. 3 is an area for reading only, and a write area WA11 is an area for reading and writing. In the two areas, the number of assigned virtual pages VPG coincides with the number of assigned physical pages PPG.

Another write area WA12 has a size of two pages in the virtual memory space, whereas the size is four pages in the physical memory space.

A difference between the write area WA11 and the write area WA12 is a difference in the number of times of rewriting which difference results from a difference between amounts of writing data occurring in the areas. The write area WA12 indicates that twice a number of times of rewriting of the write area WA11 occur in the write area WA12.

In the present embodiment, information indicating an amount of writing to a virtual page VPG is provided to the virtual memory system 10, and the virtual memory system 10 has a function of calculating and determining the number of physical pages PPG to be assigned on the basis of the information on the amount of writing.

[Process of Conversion from Virtual Address to Physical Address in Virtual Memory System]

Figure 4:
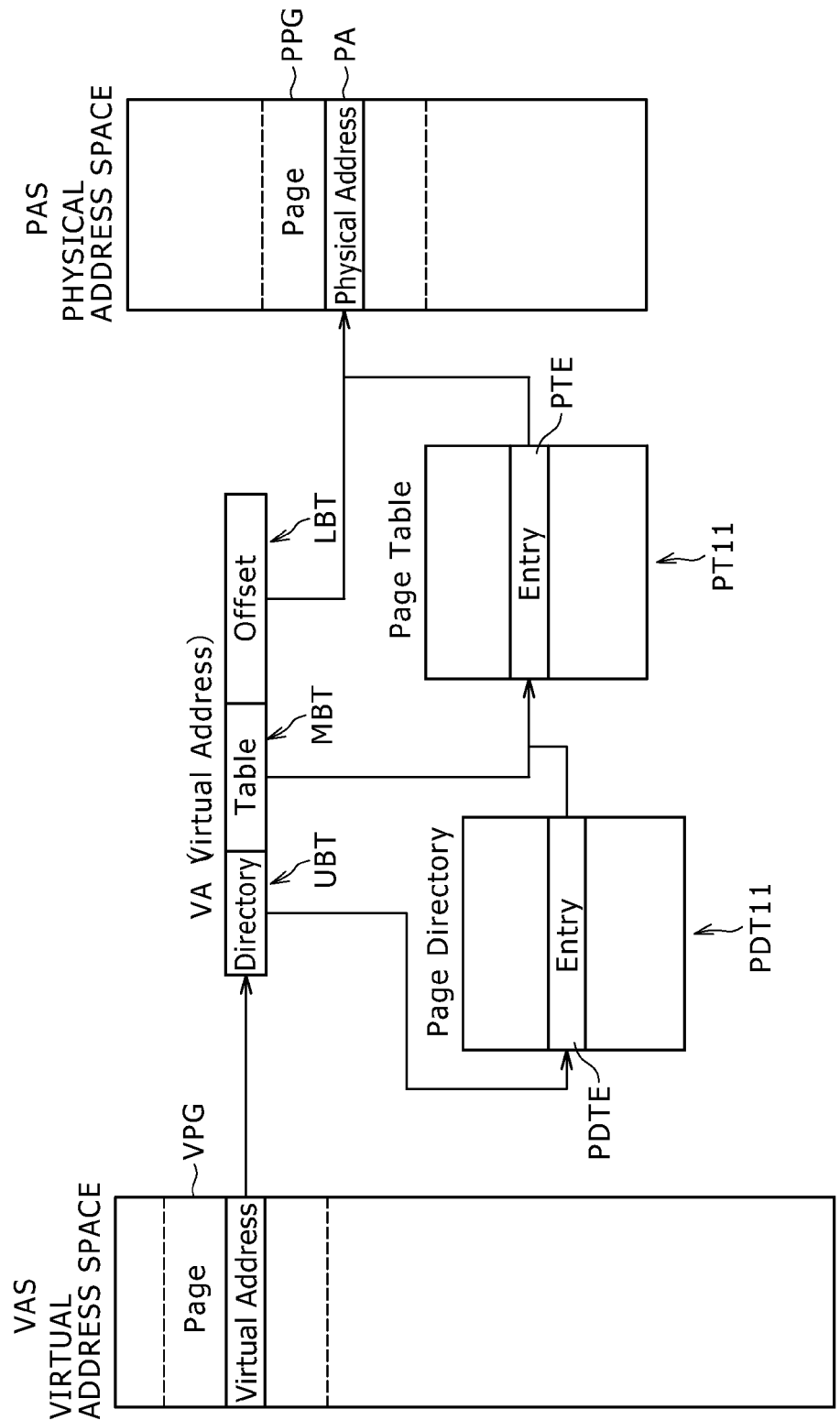
FIG. 4 is a diagram showing a process of conversion from a virtual address to a physical address in the virtual memory system.

FIG. 4 is a diagram showing a process of conversion from a virtual address to a physical address in the virtual memory system.

Two tables, that is, a page directory table PDT11 and a page table PT11 are used as a second management table for this address conversion.

The page directory table PDT11 identifies an entry PDTE in the page directory table PDT11 by using the high-order bits UBT of a virtual address VA as a reference value. Then, the page table PT11 managing the address of a physical page PPG corresponding to the virtual address area specified by the high-order bits UBT is accessed.

Next, an entry PTE in the page table PT11 is identified by using the middle-order bits of the virtual address VA as a reference value, and the address of the corresponding physical page PPG is obtained. The final physical address PA of data is determined by using the address indicated by remaining low-order bits LBT as an offset.

Thus, the page directory table PDT11 and the page table PT11 are tables having information that may be essential for the conversion of a virtual address VA to a physical address PA, and are retained in the same memory as indicated by the physical address PA.

FIG. 5 is a diagram showing an example of a physical page management information table according to the present embodiment.

Figure 6:
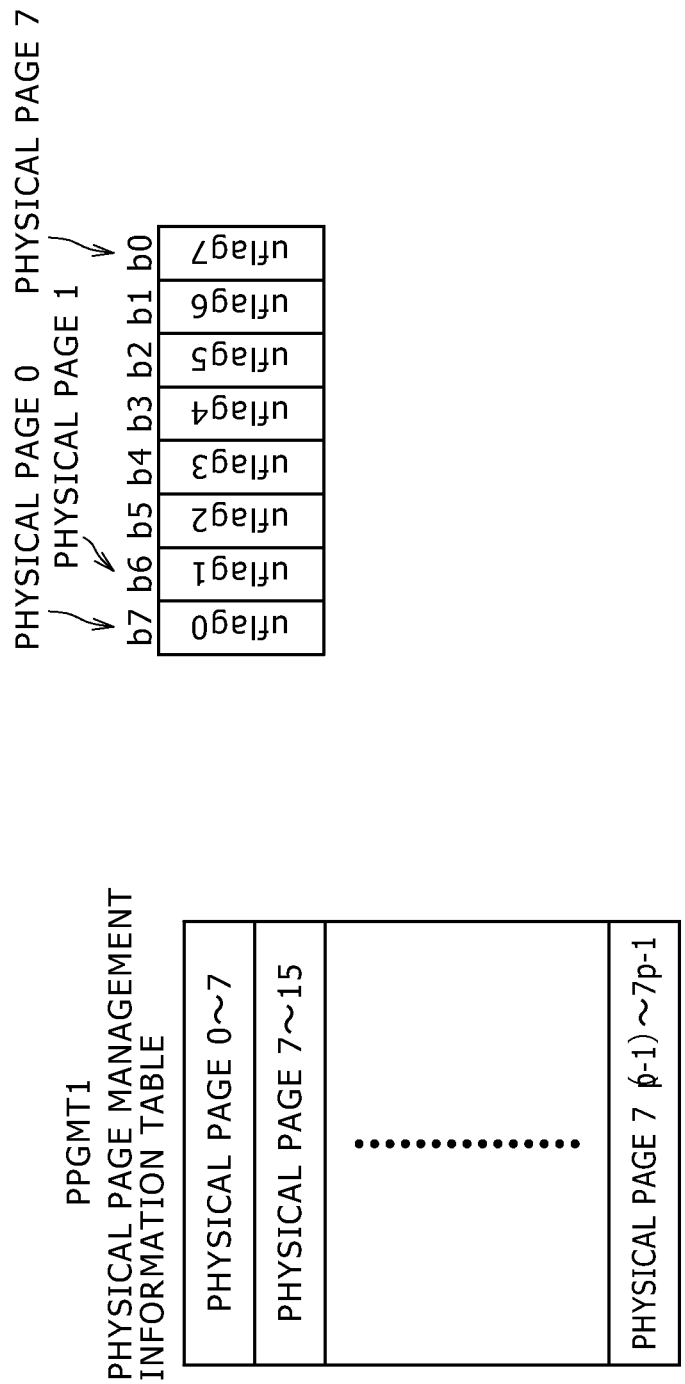
FIG. 6 is a diagram showing an example of an ordinary physical page management information table.

FIG. 6 is a diagram showing an example of an ordinary physical page management information table as an example of comparison with FIG. 5.

The first management table is a physical page management information table PPGMT1 having information indicating whether each physical page is assigned to a virtual page and is being used (use state flag uflag).

When the virtual memory control section assigns a new physical page PPG or releasing an assigned physical page PPG, the virtual memory control section changes and manages the management information of the target physical page on the basis of the physical page management information, as shown in FIG. 5 and FIG. 6.

A virtual memory system including an ordinary volatile memory stores the two management tables in the storage at a time of ending, and reproduces a state before the ending by rereading the two management tables at a time of starting.

The physical page management information according to the present embodiment has information (CWAM) indicating a writing volume up to a present time, as shown in FIG. 5, in addition to the above use state flag uflag. When the virtual memory control section assigns a new physical page or releases an assigned physical page, the virtual memory control section selects the physical page on the basis of the physical page management information, that is, on the basis of the use state flag uflag and the writing volume CWAM up to the present time, and updates and manages each of the pieces of information. The use state flag uflag is for example set at a logic "0" during nonuse and set at a logic "1" during use.

The present embodiment includes the nonvolatile random access memory 40, and thus eliminates such a need to access the storage and store the management tables in the storage.

[Example of Entries in Ordinary Page Directory Table]

Figure 7:
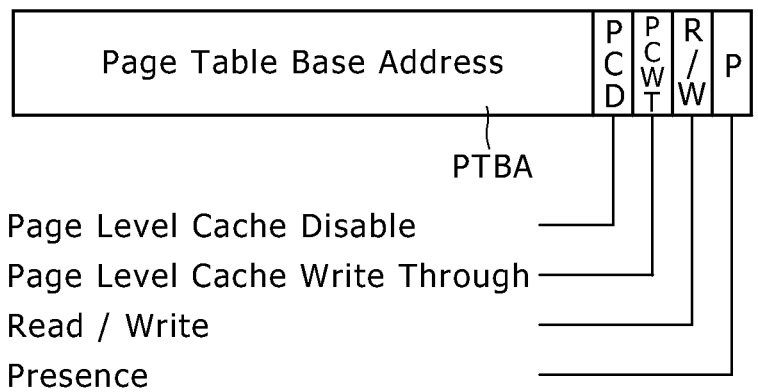
FIG. 7 is a diagram showing an example of an entry in an ordinary page directory table.

FIG. 7 is a diagram showing an example of an entry in an ordinary page directory table.

A page directory table entry PDTE1 in FIG. 7 includes a page table base address PTBA indicating a start physical address where the page table PT11 is present in an area specified by the high-order bits of a virtual address.

The page directory table entry PDTE1 is formed by the page table base address PTBA and other information bits.

A page level cache disable PCD bit indicates, when the bit is one, that the virtual address area indicated by this entry is not stored in the cache memory 23 possessed by the above-described CPU 20.

A page level cache write through PCWT bit indicates the following when the above PCD bit is zero and an R/W (Read/Write) bit to be shown later is one.

A page level cache write through PCWT bit of one indicates that writing into the virtual address area indicated by this entry is stored in the cache memory 23 possessed by the CPU 20 and is also written in the virtual address area.

That is, a page level cache write through PCWT bit of one indicates that the writing into this area is not performed into the cache memory 23, and is directly written into the physical page area indicated by the page table PT11 indicated by this entry.

A PCWT bit of zero indicates a write-back system, and indicates that writing into the virtual address area indicated by this entry is performed into the cache memory 23 possessed by the CPU 20.

The R/W bit indicates, when the bit is one, that a read access or a write access is made to the virtual address area indicated by the entry.

The R/W bit indicates "read only" when the bit is zero.

A presence P bit indicates, when the bit P is one, that the data of the virtual address area indicated by the entry is present in the memory.

A presence P bit of zero indicates that the data is swapped out and stored in the storage, and that reusing the data needs a swap-in process that assigns a new physical address space and reads the data from the storage.

[Example of Entry in Ordinary Page Table]

Figure 8:
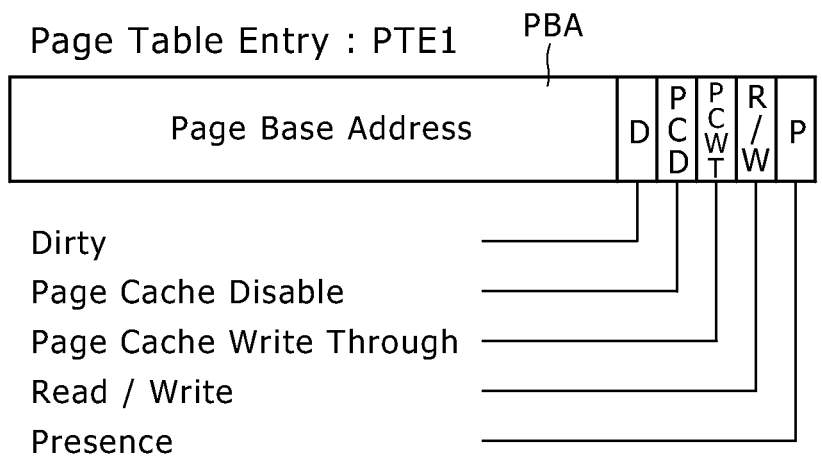
FIG. 8 is a diagram showing an example of an entry in an ordinary page table.

FIG. 8 is a diagram showing an example of an entry in an ordinary page table.

A page table entry PTE1 in FIG. 8 is formed by a page base address PBA indicating the start address of the physical page assigned to the virtual page indicated by the entry and other information bits.

A dirty bit DB indicates, when the bit is one, that writing to the physical page PPG assigned to the virtual page VPG of the entry has occurred.

The other information bits are similar to those of the page directory table entry PDTE1 in FIG. 7.

[Example of Entry in Page Directory Table According to Present Embodiment]

Figure 9:
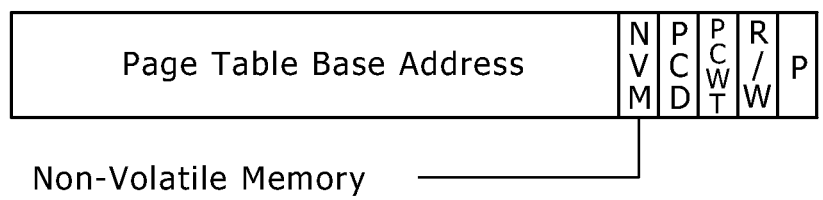
FIG. 9 is a diagram showing an example of an entry in a page directory table according to the present embodiment.

FIG. 9 is a diagram showing an example of an entry in a page directory table according to the present embodiment.

A page directory table entry PDTE11 in FIG. 9 is formed by adding an NVM (Non-Volatile Memory) bit as an information bit to the entry in FIG. 7.

The NVM bit indicates, when the bit is one, that the page table PT11 indicated by the entry and the physical page PPG assigned to the virtual address area are all in the nonvolatile random access memory 40 and in the physical page space formed by the memory having an upper limit to the number of times of rewriting.

[Example of Entry in Page Table According to Present Embodiment]

FIGS. 10A and 10B are diagrams showing an example of an entry in a page table according to the present embodiment and a process of generating a physical address from the entry and a virtual address.

A page table entry PTE11 in FIG. 10A is formed by adding three fields of information bits to the entry in FIG. 8.

The page table entry PTE11 includes page number PN bits indicating the number of physical pages assigned to the virtual page VPG indicated by this entry.

The page table entry PTE11 further includes current page number (CPN) bits indicating a page of the assigned physical pages which page is currently being used. A page base address PBA indicates the address of the physical page indicated by the page number CPN.

The page table entry PTE11 further includes an NVM (Non-Volatile Memory) bit.

The values of the PN bits and the CPN bits described above are valid when the NVM bit is one.

An NVM bit of zero indicates that the memory assigned to the virtual page is a volatile memory.

As shown in FIG. 10B, the physical address PA is generated by obtaining a logical sum (OR) of the page base address PBA of the page table entry PTE11 and the offset OFST of the virtual address VA.

[Process in Assigning New Physical Page to Virtual Page]

Figure 11:
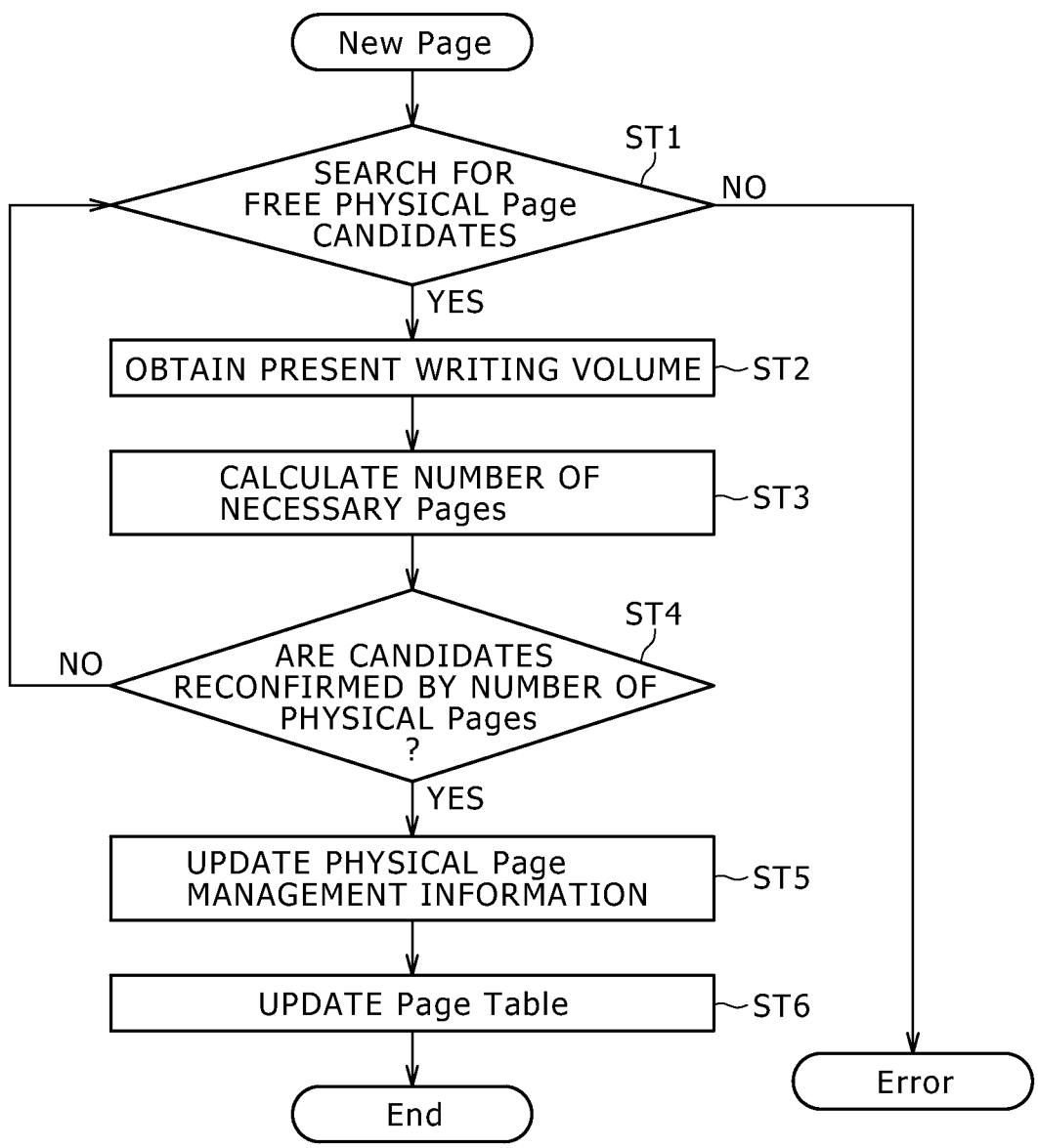
FIG. 11 is a flowchart of assistance in explaining a process when the virtual memory system according to the present embodiment assigns a new physical page to a virtual page.

FIG. 11 is a flowchart of assistance in explaining a process when the virtual memory system according to the present embodiment assigns a new physical page to a virtual page.

In first step ST1, a currently unused physical page address is obtained from the physical page management information. In second step ST2, information on the writing volume up to a present time of the physical page is obtained.

In third step ST3, the number of physical pages necessary for a requested virtual page area is calculated from the following calculating equation.

$$NPN \text{ Necessary Number of Pages} = \frac{TWAM \text{ Total Writing Volume} \times \alpha + CWAM \text{ Present Writing Volume}}{\text{Maximum Number of Times of Rewriting} \times \text{Physical Page Size } UPWN} \quad (1)$$

$$^*\alpha = \text{Weighting Factor } (\Box 1)$$

The virtual memory system 10 according to the present embodiment is defined in that when a physical page of the nonvolatile random access memory 40 is requested, information TWAM on the total writing volume of data for the area is given.

The virtual memory system 10 according to the present embodiment calculates a necessary number NPN of physical pages from the total writing volume TWAM, an upper limit value ULWN of the number of times of rewriting of the nonvolatile memory, and the total writing volume CWAM up to the present time of the physical page to be newly assigned.

In fourth step ST4, when the number of physical pages is larger than the number of requested pages, a search is made; again for a physical page that makes the assignment possible.

When an assignable physical page is found, the physical page management information is updated by changing the physical page area from an unused state to an in-use state in fifth step ST5. Further, in sixth step ST6, the start address of the physical page is registered in the page table entry.

A concrete example of calculating the number of pages will be shown.

Suppose that virtual pages and physical pages are 4 Kbytes, that the number of requested virtual pages is two, and that the upper limit to the number of times of rewriting of the nonvolatile memory is 10000 times.

When the writing volume CWAM of the physical page to be assigned is zero, and the total writing volume is 80 Mbytes or less, 10000 times of rewriting will occur as a result of calculation from the above Equation (1) (where α=1). As a result, the number of physical pages necessary for the allocation is two, which is equal to the requested size.

If the total writing volume is 160 Mbytes, the number of times of rewriting of two pages exceeds 10000 times as the upper limit, and thus four pages need to be assigned.

This calculating method is an example.

For example, when a write-back type cache is used, writing at times other than write-back times is taken in by the cache, thus causing no increase in the number of times of rewriting and providing a possibility of meeting the need by assigning fewer physical pages than in the above-described calculating method.

In addition, writing occurs also by moving data between assigned physical pages to average the number of times of rewriting.

The factor α is therefore defined in the above Equation (1). Thereby, an appropriate factor α is derived from specifications such as the capacity and type of the cache memory of the system, page size, and the like, an amount of memory used by an application operating on the system, the frequency of data movement for averaging, and the like, and the appropriate factor α is used. It is thereby possible to optimize the number of physical pages to be assigned.

The virtual memory system according to the present embodiment can eliminate a need for a process of counting the number of times of rewriting, by calculating a total writing volume in a stage of assigning physical pages. To realize the counting of the number of times of rewriting needs a mechanism for monitoring the occurrence of writing and detecting an address and a mechanism for counting and storing the number of times of writing for each address. It is difficult to provide these mechanisms for writing access to the memory, and providing these mechanisms for writing access to the memory inevitably affects performance. Eliminating the need for such counting of the number of times of rewriting is a great advantage in realizing the virtual memory system ready for the nonvolatile random access memory, which system is an object of the present disclosure.

Figure 12:
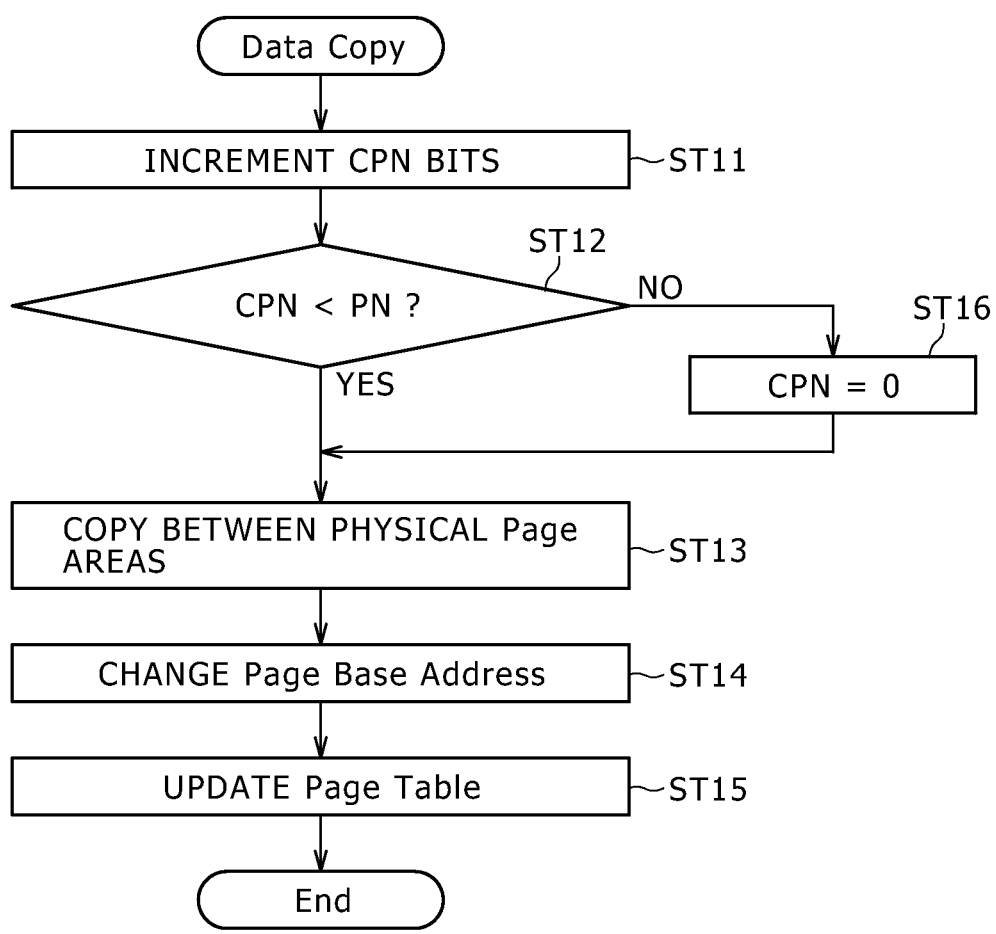
FIG. 12 is a flowchart of assistance in explaining a process of moving the data of a virtual page within physical pages to which capacity is expanded, in order to average the number of times of rewriting in the virtual memory system according to the present embodiment.

FIG. 12 is a flowchart of assistance in explaining a process of moving the data of a virtual page within physical pages to which capacity is expanded, in order to average the number of times of rewriting in the virtual memory system according to the present embodiment. The OS or the application desirably sets timing of moving the data in advance in order to calculate the volume of data writing that will occur.

In first step ST11 in FIG. 12, the value of the CPN bits of the entry stored in the page table PT11 is incremented. The new CPN bits indicate a page next to the physical page indicated by the present page base address PBA.

In second step ST12, when the value of the CPN bits coincides with the PN bits, the CPN bits are set to zero in step ST16. In this case, the new CPN bits indicate the first page of the physical pages assigned to the virtual address.

In third step ST13, the physical page indicated by the present page base address PBA is copied to the physical page indicated by the new CPN bits.

In fourth step ST14, the address of the physical page indicated by the new CPN bits is registered as a new page base address PBA in the page table entry PTE11.

In fifth step ST15, the page table entry PTE11 changed in the table TBL in fourth step ST14 is reflected in the page table PT11 present in the nonvolatile random access memory 40.

The copying of data between the physical pages as shown in FIG. 12 has an effect on the processing time of the system, and thus needs to be adjusted so as to be processible at intervals and in timing which intervals and timing are appropriate for the application of the system.

In addition, when the process of moving the data is implemented by the software of the CPU, the data occupies the data cache memory possessed by the CPU, and is thus highly likely to affect even the subsequent operating performance of the application. The process of moving the data as shown in FIG. 12 is desirably implemented by using DMA.

Figure 13:
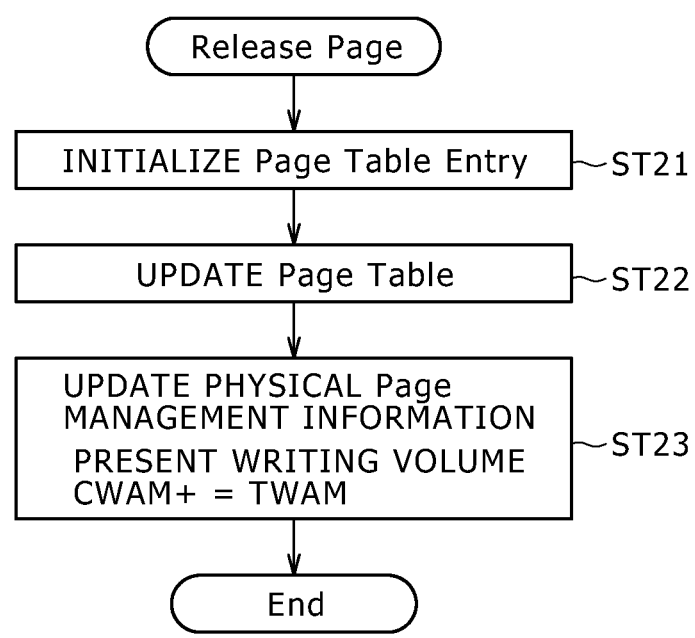
FIG. 13 is a flowchart of assistance in explaining a process in releasing a physical page assigned to a virtual page in the virtual memory system according to the present embodiment.

FIG. 13 is a flowchart of assistance in explaining a process in releasing a physical page assigned to a virtual page in the virtual memory system according to the present embodiment.

In first step ST21 in FIG. 13, the page table entry PTE11 in the table TBL is initialized.

Then, in second step ST22, the page table PT11 in the nonvolatile random access memory 40 is updated. In third step ST23, the physical page management information is updated by setting the released physical page to an unused state and adding a total writing volume TWAM to a present writing volume CWAM.

The physical page management information, the page directory table PDT11, and the page table PT11 necessary during operation of the virtual memory system 10 according to the present embodiment are all present in the nonvolatile random access memory 40.

Thus, it is not necessary to perform a process of configuring information necessary to reproduce the present state of the virtual memory and storing the information in the storage in an ending process as in an ordinary virtual memory system.

Then, a need for a process of reading the information stored in the storage at the ending time and reproducing the state of the virtual memory is also eliminated from a starting process. Thus, quick ending and starting of the system is made possible, and access to the storage can be reduced. As a result, an effect of reducing power consumption is expected to be increased in a system that repeats the starting and ending of a power supply in a complex manner, in particular.

In addition, as with an ordinary virtual memory system, the virtual memory system 10 according to the present embodiment is capable of a swap-out process and a swap-in process.

The swap-out process writes the data of the physical page to a dedicated area (swap area) in the storage, thereafter releases the physical page, and assigns the physical page to a new virtual page.

The swap-in process assigns a free physical page to a new virtual page, and thereafter reads data corresponding to the virtual page from the swap area in the storage.

2. Second Embodiment

Figure 14:
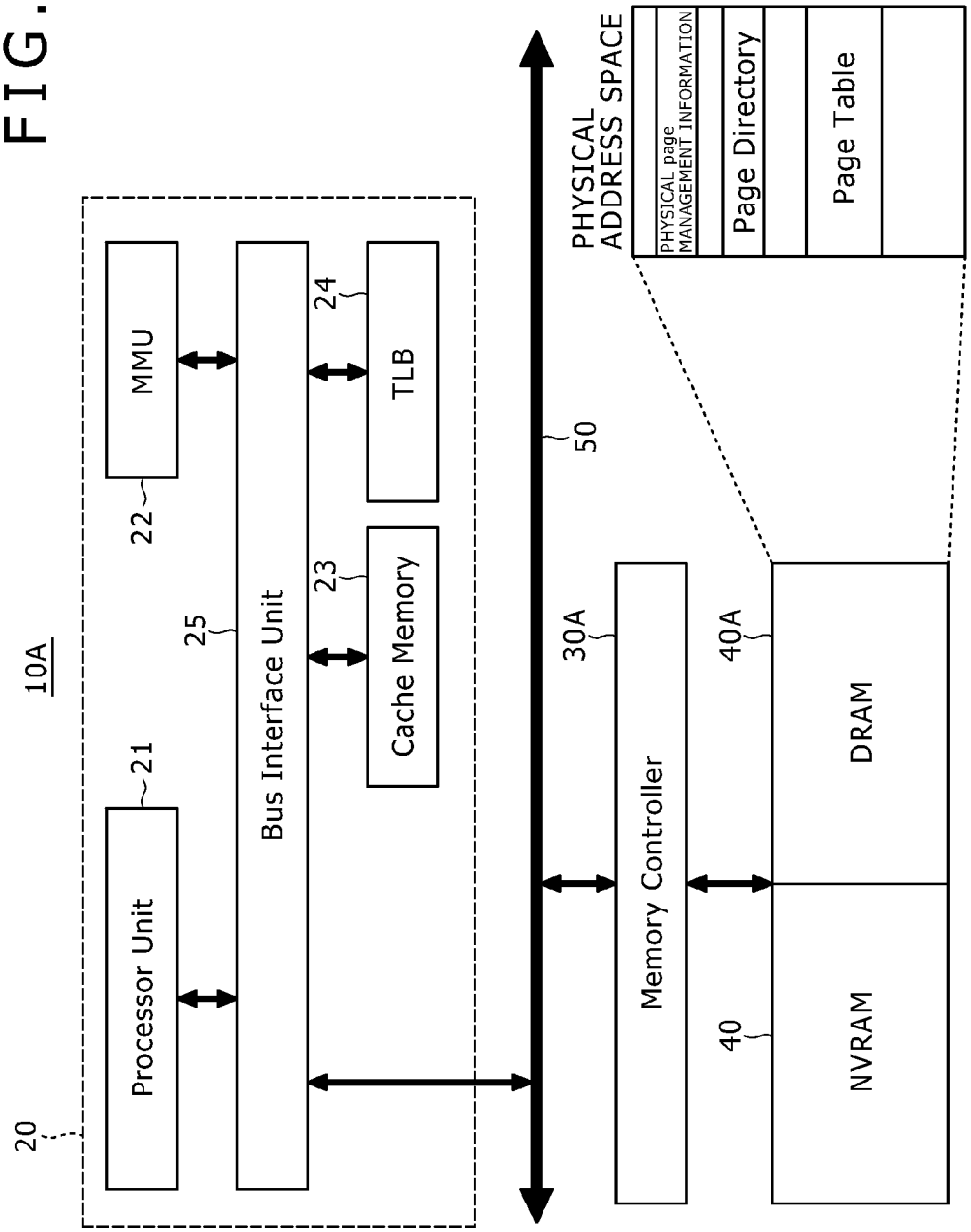
FIG. 14 is a diagram showing a configuration of a virtual memory system to which a nonvolatile random access memory (NVRAM) according to a second embodiment of the present disclosure is applied.

FIG. 14 is a diagram showing a configuration of a virtual memory system to which a nonvolatile random access memory (NVRAM) according to a second embodiment of the present disclosure is applied.

The virtual memory system 10A according to the second embodiment of the present disclosure is different from the virtual memory system 10 according to the first embodiment in the following respects.

In the virtual memory system 10A, a volatile random access memory 40A such as a DRAM or the like is connected to a memory controller 30A in addition to a nonvolatile random access memory 40.

As described with reference to FIG. 9 and FIGS. 10A and 10B, in the present embodiment, an NVM bit is added to each entry of a page directory table PDT11 and a page table PT11.

The virtual memory systems 10 and 10A according to the first embodiment and the second embodiment of the present disclosure are compatible with both of the nonvolatile random access memory 40 and the volatile random access memory 40A.

The virtual memory system 10A according to the second embodiment of the present disclosure has the volatile random access memory 40A actually connected to the memory controller 30A, and is configured to be compatible with the nonvolatile memory and the volatile memory.

Incidentally, while FIG. 14 shows one memory controller, it is also possible to arrange a plurality of memory controllers individually compatible with the nonvolatile random access memory 40 and the volatile random access memory 40A.

When the NVM bit is zero, the same operation as in an ordinary virtual memory system can be performed, and items of each entry which items are added in the present embodiment are not used.

In addition, in a starting process, entries whose NVM bit is zero among page directory table entries PDTE11 and page table entries PTE11 are initialized, but the information of entries whose NVM bit is one is used as it is.

Figure 15:
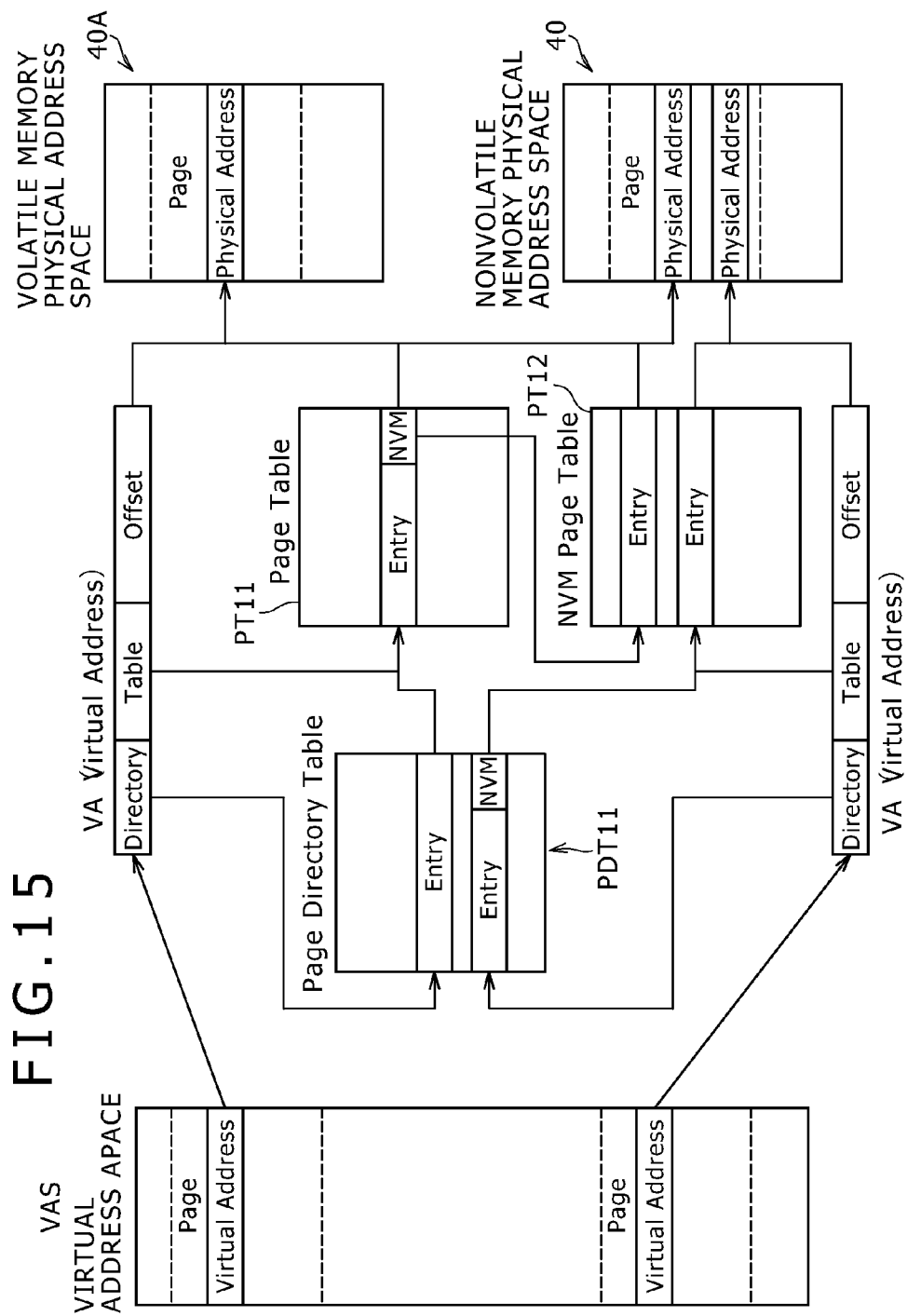
FIG. 15 is a diagram showing a process of conversion from a virtual address to a physical address in the virtual memory system in a case where independent page tables are provided for a nonvolatile memory and a volatile memory, respectively.

FIG. 15 is a diagram showing a process of conversion from a virtual address to a physical address in the virtual memory system in a case where independent page tables are provided for the nonvolatile memory and the volatile memory.

As shown in FIG. 15, a page table PT11 for the volatile memory and a page table PT12 for the nonvolatile memory are provided independently of each other as page tables. Thereby the physical pages PPG of the nonvolatile random access memory 40 can be defined independently of the size of virtual pages VPG.

In order to enhance the number of times of rewriting, the following method can be adopted as a method other than providing a higher capacity than a virtual page in physical page units as described above.

A capacity for storing ECC is added, and data on a physical page is protected by the ECC, whereby a data retention characteristic is improved. As a result, the number of times of rewriting can be enhanced.

Figure 16A:
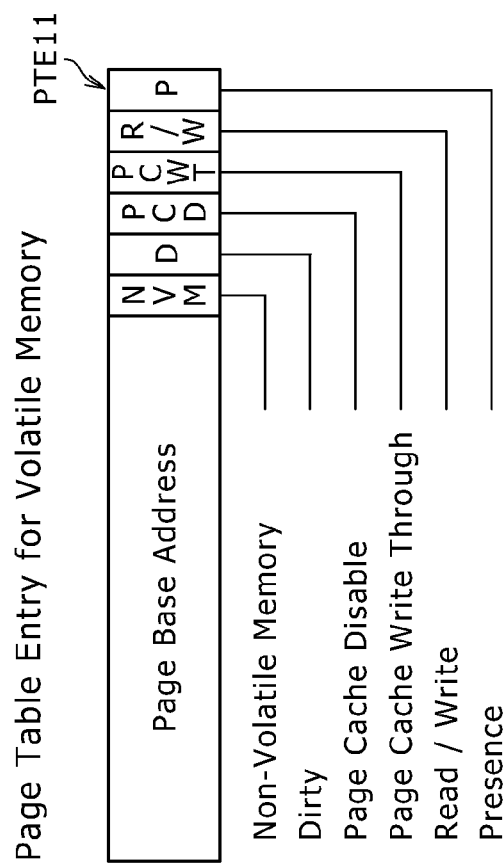
FIGS. 16A and 16B are diagrams showing an example of a page table entry for the volatile memory corresponding to the configuration of FIG. 15 and a process of generating a physical address from the entry and a virtual address.
Figure 17A:
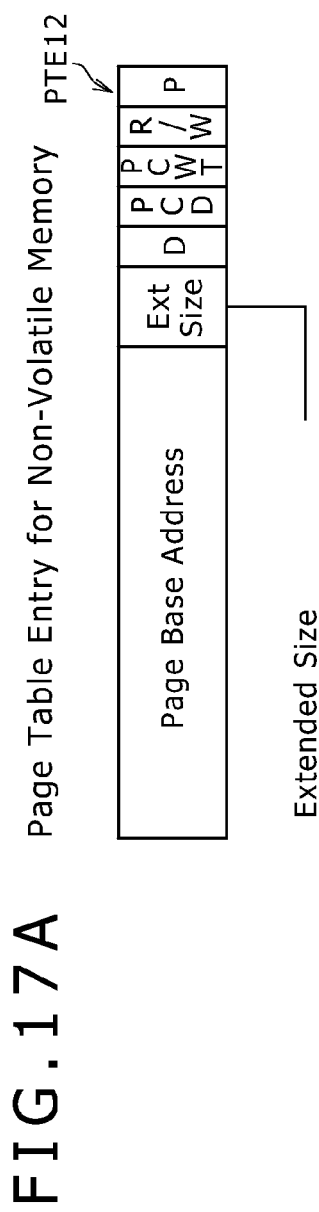
FIGS. 17A and 17B are diagrams showing an example of a page table entry for the nonvolatile memory corresponding to the configuration of FIG. 15 and a process of generating a physical address from the entry and a virtual address.

FIG. 16A and FIG. 17A show configurations of page table entries PTE in the case of the configuration of FIG. 15.

Figure 16B:
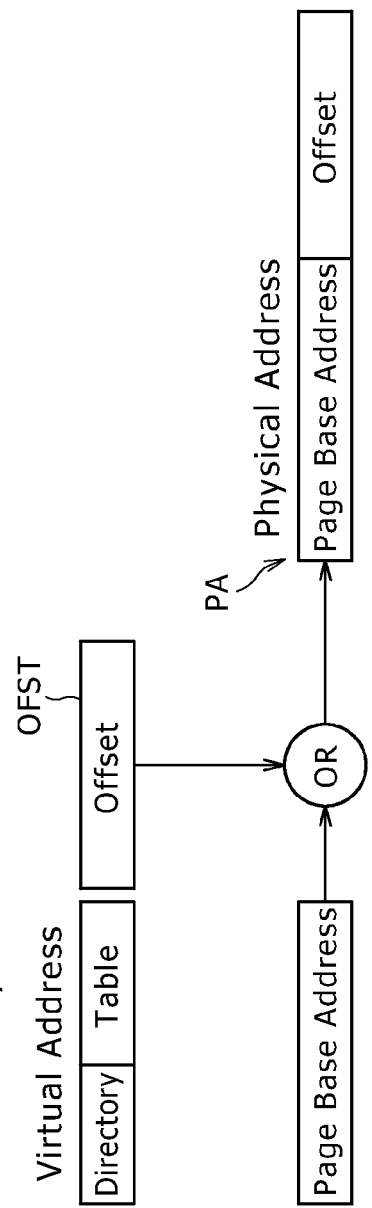

FIGS. 16A and 16B are diagrams showing an example of a page table entry for the volatile memory corresponding to the configuration of FIG. 15 and a process of generating a physical address from the entry and a virtual address.

When the NVM bit of a page directory table entry PDTE11 is zero, the page table PT11 of a page table base address PTBA indicated by the entry is formed by the page table entry PTE11.

When a part of the page table is NVM (Non-Volatile Memory), the NVM bit of the page table entry PTE11 is set to one. A page base address PBA indicates the page table including the page table entry PTE11 shown in FIG. 16A.

In this case, as shown in FIG. 16B, the physical address PA is generated by obtaining a logical sum (OR) of the page base address PBA of the page table entry PTE11 and the offset OFST of the virtual address VA.

Figure 17B:
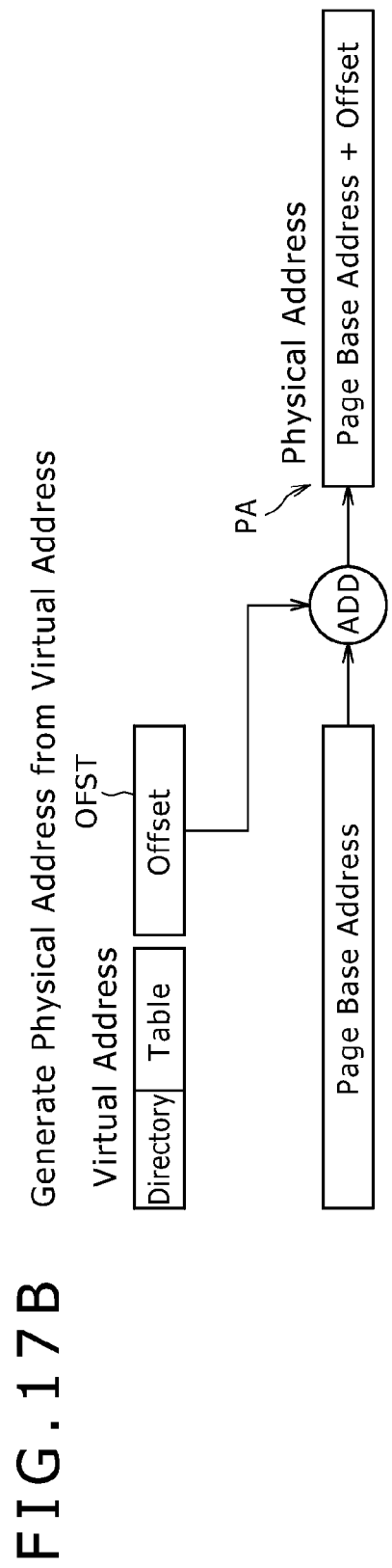

FIGS. 17A and 17B are diagrams showing an example of a page table entry for the nonvolatile memory corresponding to the configuration of FIG. 15 and a process of generating a physical address from the entry and a virtual address.

When the NVM bit of a page directory table entry PDTE11 is one, the page table of a page table base address PTBA indicated by the entry is formed by the page table entry PTE12. This page table entry PTE12 has extended size bits added thereto.

The value of the extended size bits indicates a size by which the registered physical page is expanded as compared with the virtual page.

Thus, the page base address PBA is not necessarily the address of a page boundary. Therefore an adder ADD is necessary to calculate the physical address PA, as shown in FIG. 17B.

3. Third Embodiment

Figure 18:
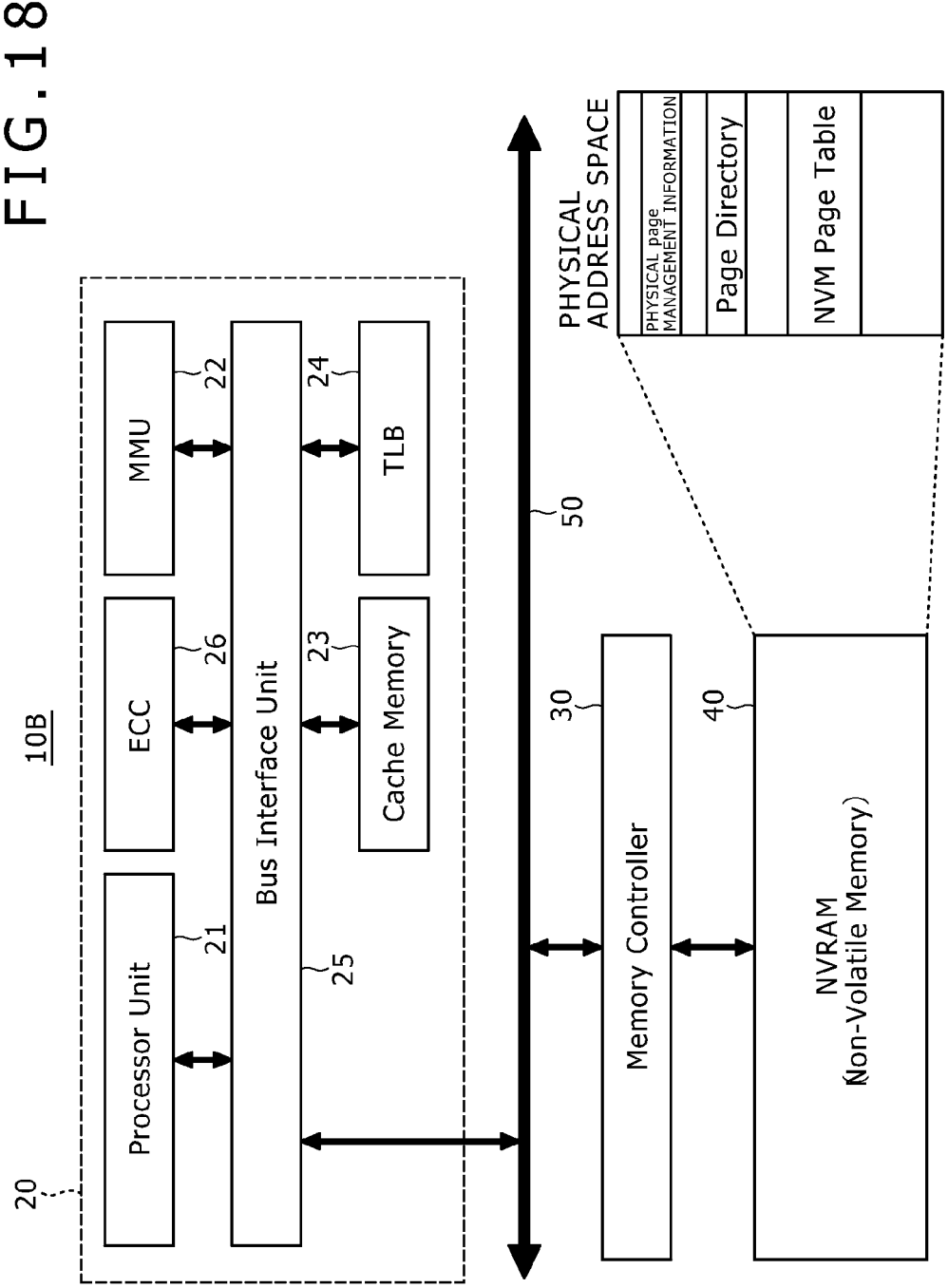
FIG. 18 is a diagram showing a configuration of a virtual memory system to which a nonvolatile random access memory (NVRAM) according to a third embodiment of the present disclosure is applied.

FIG. 18 is a diagram showing a configuration of a virtual memory system to which a nonvolatile random access memory (NVRAM) according to a third embodiment of the present disclosure is applied.

The virtual memory system 10B according to the third embodiment of the present disclosure is different from the virtual memory system 10 according to the first embodiment in that an ECC circuit 26 is disposed in a CPU 20A as a virtual memory control section.

Data read from a nonvolatile random access memory 40 is transferred to a cache memory 23. In a case of data having ECC added thereto, data after error detection and error correction by the ECC circuit 26 is transferred to the cache memory 23.

In addition, at a time of writing, data in the cache memory 23 is transferred to the nonvolatile random access memory 40 via a memory controller 30. The data is written with an ECC code added thereto.

Incidentally, this constitution can also be applied to the virtual memory system according to the second embodiment.

As described above, the present embodiment provides the following effects.

The virtual memory system according to the present embodiment has a function of determining the allocation and size of a memory area in consideration of the number of times of rewriting of the memory area to be allocated from an application.

Thus, according to the present embodiment, by increasing the capacity to be allocated as the number of times of rewriting is increased, the capacity can be allocated such that the number of times of rewriting falls within the upper limit specification of the nonvolatile random access memory. In addition, even the nonvolatile random access memory having an upper limit to the number of times of rewriting can be accessed from an application as a nonvolatile memory without an upper limit to the number of tithes of rewriting.

In addition, the function of receiving an internal event of a timer or the like or an instruction from an OS or an application and moving data between assigned physical pages efficiently uniformizes the number of times of rewriting within the assigned areas. It is thereby possible to reduce the capacity that increases according to the number of times of rewriting, and improve memory use efficiency.

In addition, according to the present embodiment, information on the upper limit to the number of times of rewriting of the nonvolatile random access memory connected to the virtual memory system can be obtained from the memory controller.

Thus, even when nonvolatile random access memories having different upper limits to the number of times of rewriting are connected, an optimum number of physical pages for each nonvolatile random access memory can be allocated in response to a certain allocation request. It is also possible to select a nonvolatile random access memory for securing physical pages according to a requested number of times of rewriting and a requested capacity, and thus improve memory use efficiency.

In addition, the methods described above in detail can be formed as a program corresponding to the above procedures, and performed on a computer such as a CPU or the like.

In addition, such a program can be recorded on a recording medium such as a semiconductor memory, a magnetic disk, an optical disk, a floppy (registered trademark) disk, or the like, and accessed by a computer in which the recording medium is set so that the program is executed.

Incidentally, the present disclosure can also adopt the following constitutions.

(1) A virtual memory system including:

a nonvolatile memory allowing random access, having an upper limit to a number of times of rewriting, and including a physical address space accessed via a virtual address; and a virtual memory control section configured to manage the physical address space of the nonvolatile memory in page units, map the physical address space and a virtual address space, and convert an accessed virtual address into a physical address;

wherein the virtual memory control section is configured to expand a physical memory capacity allocated to a virtual page in which rewriting occurs.

(2) The virtual memory system according to the above (1), wherein the virtual memory control section receives a request to assign a physical page to the virtual page and information on an amount of data writing to the requested area, and expands the physical memory capacity allocated to the virtual page on a basis of the received information on the amount of writing.

(3) The virtual memory system according to the above (1) or the above (2), wherein the virtual memory control section maps the physical address and the virtual address in page units, and the virtual memory control section expands the physical memory capacity by assigning a plurality of physical pages to the virtual page in which rewriting occurs on a basis of information on an amount of writing to the virtual page.

(4) The virtual memory system according to one of the above (1) to the above (3), wherein the virtual memory control section determines a capacity to which to expand the physical memory capacity according to a result of calculation of a number of times of rewriting occurring in a corresponding physical page from information on an amount of data writing.

(5) The virtual memory system according to one of the above (1) to the above (4), wherein the virtual memory control section is configured to average a number of times of writing by having a function of moving data between assigned physical pages according to an internal event of a timer or the like or an instruction from an OS or an application.

(6) The virtual memory system according to one of the above (1) to the above (5), further including a table including information for converting the virtual address to the physical address, wherein the information of the table includes information indicating whether a physical page is assigned to a virtual page and is being used or whether the physical page is unassigned and unused and information on a cumulative volume of past writing of the physical page as physical page management information.

(7) The virtual memory system according to the above (6), wherein the virtual memory control section determines a capacity to which to expand the physical memory capacity according to a result of calculation of a number of times of rewriting occurring in a corresponding physical page from information on an amount of data writing, and the information of the table includes table information for managing a physical page address assigned to the virtual page, and the table information includes information indicating whether the corresponding physical page is in the nonvolatile memory and information on the determined capacity to which the physical page is expanded.

(8) The virtual memory system according to the above (7),
wherein the virtual memory system retains information indicating a volume of writing that has occurred up to a present time for each physical page, and
the virtual memory control section moves data between physical pages in response to an internal event or an instruction from an OS or an application.

(9) The virtual memory system according to the above (8),
wherein the virtual memory control section performs control to access a part of the capacity to which the physical page is expanded.

(10) The virtual memory system according to one of the above (6) to the above (9),
wherein the information of the table is stored in the nonvolatile memory.

(11) The virtual memory system according to one of the above (1) to the above (10),
wherein the virtual memory control section is configured to manage the physical address space of the nonvolatile memory in page units, map the physical address space and the virtual address space, and convert the accessed virtual address into the physical address, and is also configured to assign a new physical page to a virtual page and release a physical page assigned to a virtual page.

(12) The virtual memory system according to the above (11),
wherein the virtual memory control section manages correspondence between virtual pages and physical pages by a management table,
when there is a shortage of unused physical pages, the virtual memory control section performs control to select a physical page determined to have a little effect on performance from among physical pages already assigned to virtual pages, and write data of the selected physical page to a dedicated area in a storage, and
the virtual memory control section sets a flag indicating that the physical page is not present in the memory as an attribute of a virtual page assigned the physical page saved to the storage in the management table.

(13) The virtual memory system according to the above (12),
wherein when the data of the physical page, the data of the physical page having been written to the dedicated area in the storage, becomes necessary again, the virtual memory control section performs control to read the data into a free physical page, and
the virtual memory control section resets the flag indicating that the physical page is not present in the memory in the management table.

(14) The virtual memory system according to one of the above (1) to the above (13), further including a memory controller for accessing the nonvolatile memory according to a control process of the virtual memory control section,
wherein the virtual memory control section obtains information on the upper limit to the number of times of rewriting of the nonvolatile memory from the memory controller.

(15) A virtual memory controlling method including:
in managing a physical address space of a nonvolatile memory in page units, the nonvolatile memory allowing random access, having an upper limit to a number of times of rewriting, and including a physical address space accessed via a virtual address, mapping the physical address space and a virtual address space, and converting an accessed virtual address into a physical address,
when rewriting occurs in a virtual page, expanding a physical memory capacity allocated to the virtual page according to information on an amount of writing to the virtual page.

(16) A program for making a computer perform a virtual memory controlling process, the virtual memory controlling process including:
in managing a physical address space of a nonvolatile memory in page units, the nonvolatile memory allowing random access, having an upper limit to a number of times of rewriting, and including a physical address space accessed via a virtual address, mapping the physical address space and a virtual address space, and converting an accessed virtual address into a physical address,
when rewriting occurs in a virtual page, expanding a physical memory capacity allocated to the virtual page according to information on an amount of writing to the virtual page.

The present disclosure contains subject matter related to that disclosed in Japanese Priority Patent Application JP 2011-047376 filed in the Japan Patent Office on Mar. 4, 2011, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. A virtual memory system comprising:
a nonvolatile memory allowing random access, and having an upper limit to a number of times of rewriting, wherein the nonvolatile memory includes a physical address space accessed via a virtual address; and
a virtual memory control section configured to manage said physical address space of said nonvolatile memory in page units, map said physical address space and a virtual address space, and convert an accessed virtual address into a physical address,
wherein said virtual memory control section is configured to expand a physical memory capacity allocated to a virtual page in which rewriting occurs, wherein said virtual memory control section expands said physical memory capacity of said virtual page by assigning a plurality of physical pages to said virtual page, and wherein a number of said plurality of physical pages to be assigned to said virtual page is calculated based on a total amount of data written, up to a time at which a request to assign a physical page of said plurality of physical pages to said virtual page is received, for each physical page of said plurality of physical pages and information on an amount of data to be written.

2. The virtual memory system according to claim 1, wherein said virtual memory control section is configured to receive said request to assign said physical page of said plurality of physical pages to said virtual page and said information on said amount of data to be written to a requested area, and expand said physical memory capacity allocated to said virtual page based on said received information on said amount of data to be written.

3. The virtual memory system according to claim 1, wherein said virtual memory control section is configured to map said physical address and said virtual address in page units, and said virtual memory control section is configured to assign one or more of said plurality of physical pages to said virtual page based on said information on said amount of data to be written to said virtual page.

4. The virtual memory system according to claim 1, wherein said virtual memory control section is configured to determine a capacity to which a physical memory is expanded according to a result of calculation of a number of times of rewriting occurring in a corresponding physical page from said information on said amount of data to be written.

5. The virtual memory system according to claim 1, wherein said virtual memory control section is configured to average a number of times of writing between one or more of said plurality of physical pages assigned to said virtual page.

6. The virtual memory system according to claim 1, further comprising a table including information for converting said virtual address to said physical address, wherein said information of said table includes information indicating whether a physical page of said plurality of physical pages is assigned to said virtual page and is being used or whether said physical page is unassigned and unused, and information on a cumulative volume of past writing of said physical page as physical page management information.

7. The virtual memory system according to claim 6, wherein said virtual memory control section is configured to determine a capacity to which a physical memory is expanded according to a result of calculation of a number of times of rewriting occurring in a corresponding physical page based on said information on said amount of data to be written, and
wherein said information of said table includes table information for managing a physical page address assigned to said virtual page, and said table information includes information indicating whether said corresponding physical page is in said nonvolatile memory and information on said determined capacity to which said physical page is expanded.

8. The virtual memory system according to claim 7, wherein said virtual memory system is configured to retain information indicating said total amount of data written up to said time for each physical page of said plurality of physical pages, and said virtual memory control section is configured to move data between one or more of said plurality of physical pages assigned to said virtual page in response to one of an internal event of a timer and an instruction from an operating system (OS) or an application.

9. The virtual memory system according to claim 8, wherein said virtual memory control section is configured to perform control to access a part of the capacity to which said physical page is expanded.

10. The virtual memory system according to claim 6, wherein said information of said table is stored in said nonvolatile memory.

11. The virtual memory system according to claim 1, wherein said virtual memory control section is configured to assign a new physical page of said plurality of physical pages to said virtual page and release a physical page assigned to said virtual page.

12. The virtual memory system according to claim 1, wherein when there is a shortage of unused physical pages, said virtual memory control section is configured to:
manage correspondence between virtual pages and physical pages based on a management table;
perform control to select a physical page determined to be not required by said virtual memory system from among said plurality of physical pages already assigned to virtual pages;
write data of said physical page to a dedicated area in a storage; and
set a flag in said management table to indicate that said physical page is not present in said nonvolatile memory.

13. The virtual memory system according to claim 12, wherein when said data of said physical page having been written to said dedicated area in said storage is required by said virtual memory system, said virtual memory control section is configured to:
perform control to read said data into a free physical page, and
reset said flag indicating that said physical page is not present in said nonvolatile memory in said management table.

14. The virtual memory system according to claim 1, further comprising a memory controller for accessing said nonvolatile memory according to a control process of said virtual memory control section, wherein said virtual memory control section is configured to obtain information on said upper limit to said number of times of rewriting of said nonvolatile memory from said memory controller.

15. A virtual memory controlling method comprising:
managing a physical address space of a nonvolatile memory in page units, wherein said nonvolatile memory allows random access, has an upper limit to a number of times of rewriting, and includes a physical address space accessed via a virtual address;
mapping said physical address space and a virtual address space, and converting an accessed virtual address into a physical address; and
expanding a physical memory capacity allocated to said virtual page according to information on an amount of writing to said virtual page in which rewriting occurs,
wherein said physical memory capacity of said virtual page is expanded by assigning a plurality of physical pages to said virtual page, and wherein a number of said plurality of physical pages to be assigned to said virtual page is calculated based on a total amount of data written, up to a time at which a request to assign a physical page of said plurality of physical pages to said virtual page is received, for each physical page of said plurality of physical pages and information on an amount of data to be written.

16. A non-transitory computer-readable storage medium having stored thereon, a set of computer-executable instructions for causing a computer to perform steps comprising:
managing a physical address space of a nonvolatile memory in page units, wherein said nonvolatile memory allows random access, has an upper limit to a number of times of rewriting, and includes a physical address space accessed via a virtual address;
mapping said physical address space and a virtual address space, and converting an accessed virtual address into a physical address;
expanding a physical memory capacity allocated to said virtual page according to information on an amount of writing to said virtual page in which rewriting occurs,
wherein said physical memory capacity of said virtual page is expanded by assigning a plurality of physical pages to said virtual page, and wherein a number of said plurality of physical pages to be assigned to said virtual page is calculated based on a total amount of data written, up to a time at which a request to assign a physical page of said plurality of physical pages to said virtual page is received, for each physical page of said plurality of physical pages and information on an amount of data to be written.

17. The virtual memory system according to claim 1, wherein said physical address space is managed based on said total amount of data written up to said time for each physical page of said nonvolatile memory.

\* \* \* \* \*